(12) United States Patent
Corrion et al.

(10) Patent No.: US 6,652,793 B2
(45) Date of Patent: *Nov. 25, 2003

(54) METHOD OF MANUFACTURING A VEHICLE CUP HOLDER ARM ASSEMBLY

(75) Inventors: Dean Corrion, Grosse Pointe Park, MI (US); Joseph J. Davis, Jr., Ortonville, MI (US); Jack S. Palazzolo, Dearborn, MI (US); Michael J. Hier, Royal Oak, MI (US); Timothy R. Hubbert, Novi, MI (US)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/191,348

(22) Filed: Jul. 8, 2002

(65) Prior Publication Data

US 2002/0180102 A1 Dec. 5, 2002

Related U.S. Application Data

(63) Continuation of application No. 09/733,278, filed on Dec. 8, 2000, now Pat. No. 6,468,457.
(60) Provisional application No. 60/170,937, filed on Dec. 15, 1999.

(51) Int. Cl.[7] .............................. B29C 45/14; A45F 5/00
(52) U.S. Cl. ..................... 264/242; 264/254; 264/255; 264/264; 224/281
(58) Field of Search ................................. 264/242, 245, 264/246, 247, 248, 264, 294, 255, 254, 259; 224/240, 251, 281, 282; 215/224, 292; 403/DIG. 11, 297, 309

(56) References Cited

U.S. PATENT DOCUMENTS

| | | | |
|---|---|---|---|
| 2,800,360 A | 6/1957 | Jenkins | |
| 3,000,049 A | 9/1961 | Terry, Jr. | |
| 3,591,669 A | 7/1971 | Memory | |
| 4,485,064 A | 11/1984 | Laurin | |
| 4,702,156 A | 10/1987 | Sano | |
| 4,890,356 A | 1/1990 | Czech et al. | |
| 5,165,002 A | 11/1992 | Cumberledge et al. | |
| 5,167,392 A | 12/1992 | Henricksen | |
| 5,289,962 A | 3/1994 | Tull et al. | |
| 5,333,023 A | 7/1994 | Oxford | |
| 5,598,999 A | 2/1997 | Plocher et al. | |
| 5,826,311 A | 10/1998 | Henricksen | |
| 5,894,635 A * | 4/1999 | Lu | 403/297 |
| 5,944,240 A | 8/1999 | Honma | |
| 5,950,017 A | 9/1999 | Reff | |
| 6,290,701 B1 | 9/2001 | Enayati | |
| 6,302,364 B1 | 10/2001 | Chiueh | |
| 6,468,457 B2 * | 10/2002 | Corrion et al. | 264/242 |
| 2002/0180102 A1 * | 12/2002 | Corrion et al. | 264/242 |

FOREIGN PATENT DOCUMENTS

EP 0761984 A1 12/1997

OTHER PUBLICATIONS

International Search Report, Mar. 30, 2001.

* cited by examiner

Primary Examiner—Mark Eashoo
Assistant Examiner—Geoffrey Shipsides
(74) Attorney, Agent, or Firm—Bill C. Panagos

(57) ABSTRACT

The present invention provides a method of manufacturing a vehicle cup holder arm, and a vehicle cup holder assembly produced thereby. The method includes injection molding a first material to form a base including an attachment feature adapted for engagement within an aperture adjacent a cup holder opening in a vehicle. A second material is injection molded to form an arm cup around the base and includes an arm. The second material does not chemically bond to the first material so that the arm cup and arm are rotatable with respect to the base for adjustably securing a cup in the cup holder opening. A third material is injection molded onto the arm to form a soft rubber grip for engaging a cup. The cup holder arm may be movable vertically for adjustment with respect to differently-sized cups.

7 Claims, 7 Drawing Sheets

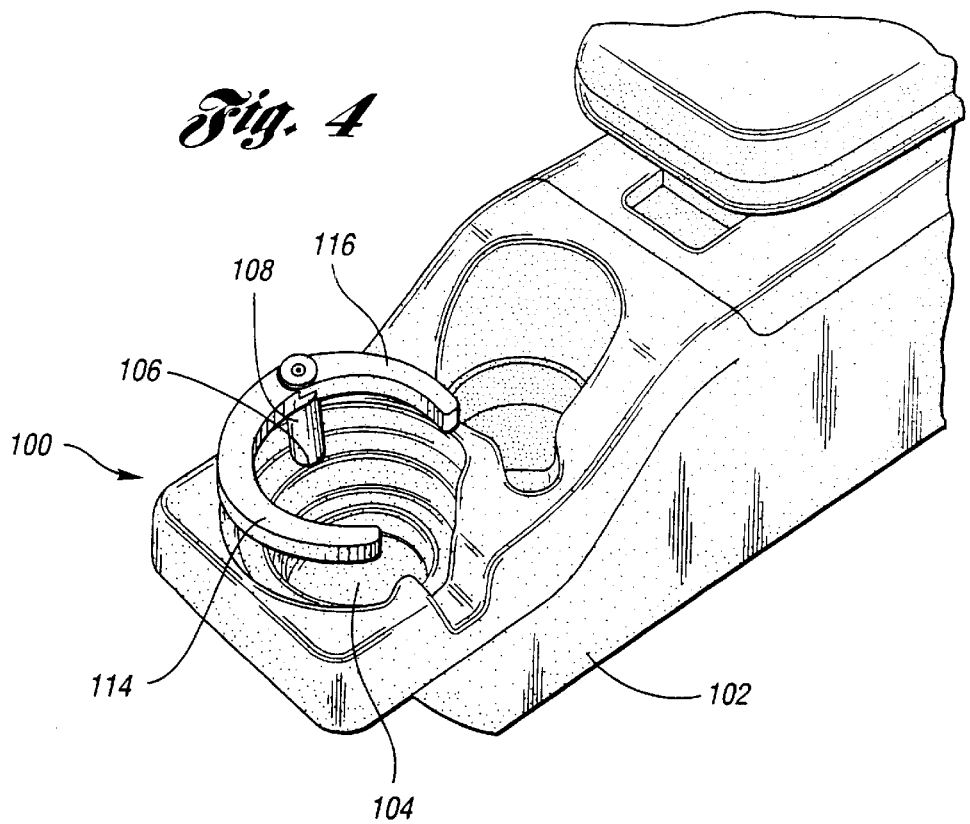
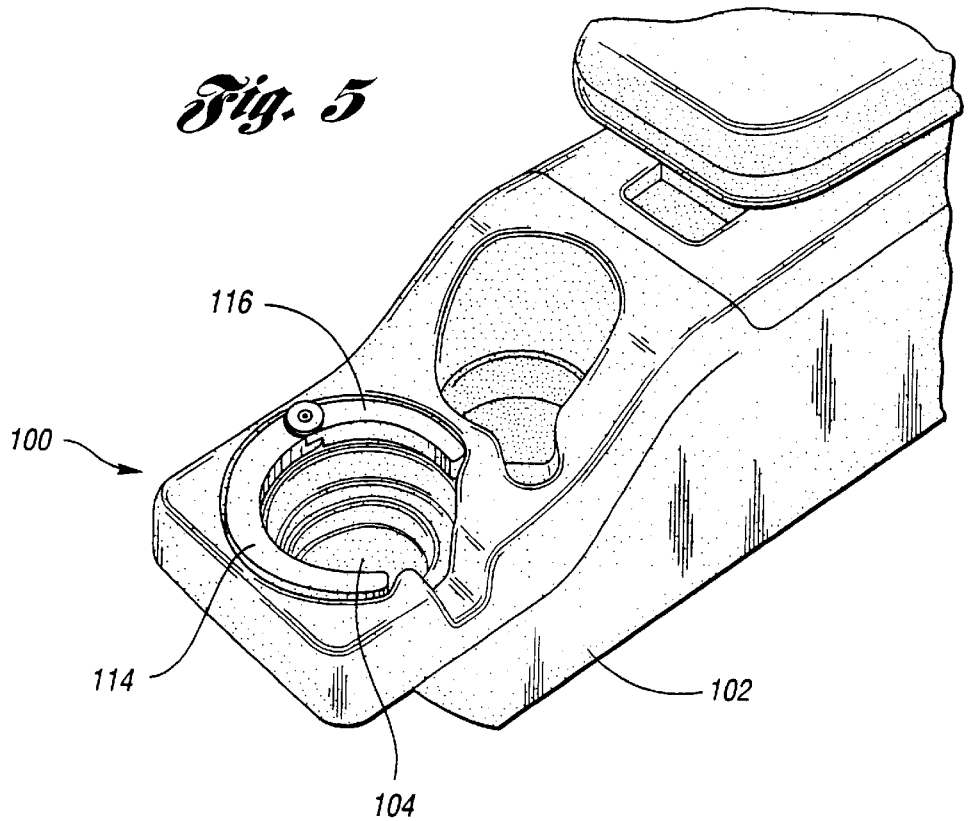

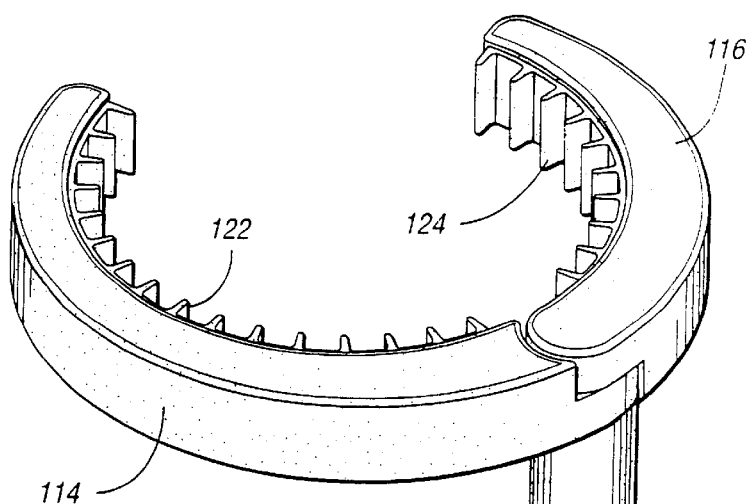
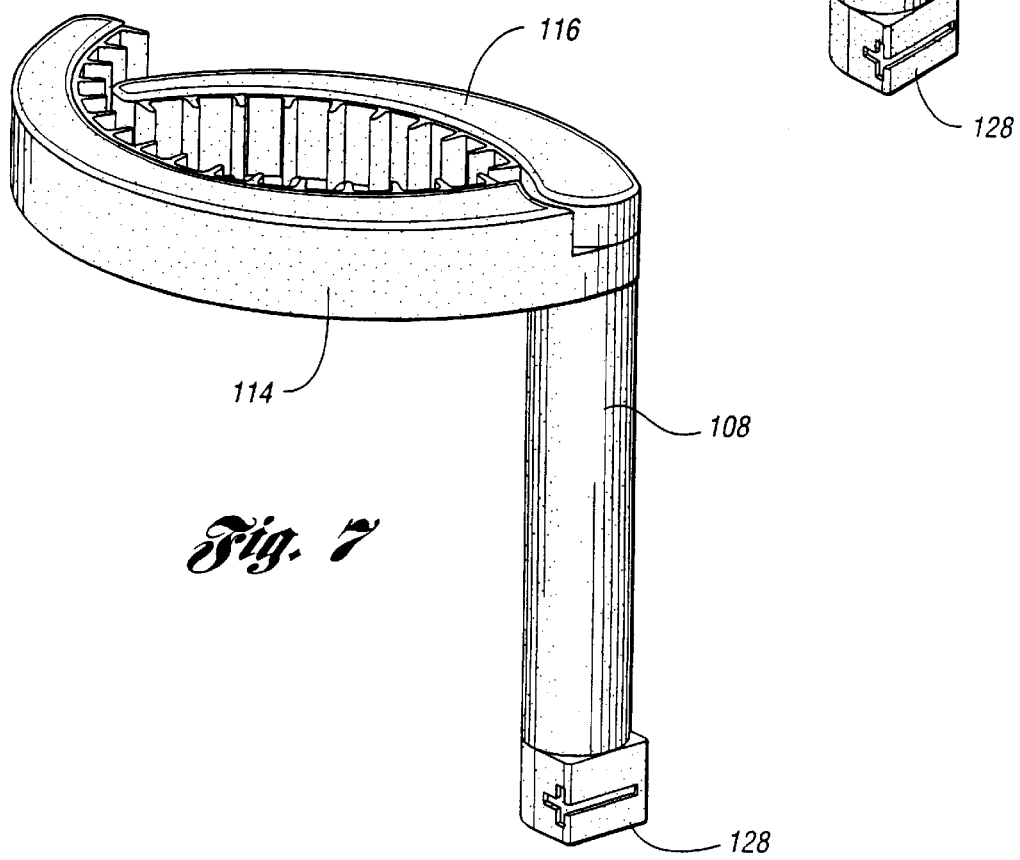
Fig. 6
Fig. 7

METHOD OF MANUFACTURING A VEHICLE CUP HOLDER ARM ASSEMBLY

CROSS-REFERENCE TO RELATED APPLICATIONS

This application is a continuation of U.S. Application Ser. No. 09/733,278, filed Dec. 8, 2000, now U.S. Pat. No. 6,468,457, which in turn, claims the benefit of U.S. provisional application Ser. No. 60/170,937, filed Dec. 15, 1999.

TECHNICAL FIELD

The present invention relates to a method of manufacturing a vehicle cup holder arm assembly including a multi-shot injection molding process and a cup holder assembly produced thereby.

BACKGROUND ART

Vehicle cup holder assemblies are popular in modern vehicle designs. Countless variations of cup holder assemblies exist, each variation having varying degrees of efficiency, practicality, manufacturability and cost.

Vehicle interior designers have continuously modified cup holder designs to improve aesthetics of the design and to improve functionality as cost constraints continue to tighten. The ideal design would be inexpensive to manufacture, simple to assemble, be aesthetically pleasing, and provide improved functionality such that it could securely hold a variety of shapes and sizes of cups.

Accordingly, it is desirable to provide an improved vehicle cup holder assembly and method of manufacturing the same which achieves these stated goals while reducing cost of manufacturing and assembly.

DISCLOSURE OF INVENTION

The present invention improves upon prior art vehicle cup holder assembly manufacturing processes by providing a multi-shot molding process for manufacturing a cup holder arm assembly. The cup holder arm assembly is adapted to snap-fit into an aperture formed in a vehicle adjacent a cup holder opening. Tile arm is pivotally adjustable with respect to the cup holder opening to position the cup holder arm against a cup to secure the cup in the opening. The arm assembly is adjustable to multiple positions and assembly is greatly simplified as a result of its use of a multi-shot injection molding process for manufacturing.

Specifically, the present invention provides a method of manufacturing a vehicle cup holder arm assembly in which a first material is injection molded to form a base including an attachment feature adapted for engagement within an aperture adjacent a cup holder opening in a vehicle. With the base positioned in a mold, a second material is injection molded to form an arm cup around the base, and also forms an arm integral with the arm cup. The second material does not chemically bond to the first material so that the arm cup and arm are rotatable with respect to the base for adjustably securing a cup in the cup holder opening. A third material is injection molded onto the arm to form a soft rubber grip for engaging a cup.

In one embodiment, a plurality of rubber bumps are formed on the base prior to molding the second material. The rubber bumps are operative to provide sufficient frictional engagement with the arm cup to hold the arm in any of a variety of selected positions after the arm is adjusted to securely engage a cup. The attachment feature preferably comprises a plurality of snap tabs.

Also, the rubber bumps are preferably formed of the same material as the third material injection molded to form the rubber grip. The first material is preferably polypropylene and the second material is preferably ABS.

Another aspect of the invention provides a vehicle cup holder assembly with many of the above features, and also including a pop-up feature for vertically adjusting the position of the cup holder arm for differently-sized cups. The arm is movable between collapsed and extended positions, and pivotally adjustable in each position for securing a cup.

More specifically, the above stated aspect of the invention provides a vehicle cup holder assembly including a vehicle component, such as a console, having a cup holder opening therein and an aperture formed adjacent the cup holder opening. A base is injection molded from a first material and includes an attachment feature configured to extend into the aperture and is selectively movable between extended and collapsed positions with respect to the aperture. An arm cup is injection molded from a second material at least partially around the base and includes an arm. The second material is not chemically bonded to the first material so that the arm cup and arm are rotatable with respect to the base for adjustably securing a cup in the cup holder opening. Preferably, a friction fit is provided between the arm cup and base, such as slidably engaged teeth. A second arm is also included and non-rotatably mounted to the base. A third material may be molded onto the arm to form a rubber grip.

Accordingly, an object of the present invention is to provide an improved method of manufacturing a vehicle cup holder arm assembly in which functionality of the cup holder is improved, aesthetic appearance is improved, and overall cost is maintained or reduced.

A further object of the invention is to provide a cup holder assembly including a cup engagement arm which is movable vertically and pivotally for adjustment to support differently-sized cups in a cup holder opening positioned adjacent the arm.

The above object and other objects, features and advantages of the present invention are readily apparent from the following detailed description of the best mode for carrying out the invention when taken in connection with the accompanying drawings.

BRIEF DESCRIPTION OF DRAWINGS

FIG. 4 shows a perspective view of a cup holder assembly in accordance with an alternative embodiment of the invention, with the cup holder arm in the extended position;

FIG. 5 shows a perspective view of the cup holder assembly of FIG. 4, with the cup holder arm in the collapsed position;

FIG. 6 shows a perspective view of the cup holder arm assembly of FIG. 4 with the arm in the open position;

FIG. 7 shows a perspective view of the cup holder arm assembly of FIG. 4 with the arm in the closed position;

BEST MODE FOR CARRYING OUT THE INVENTION

Figure 1:
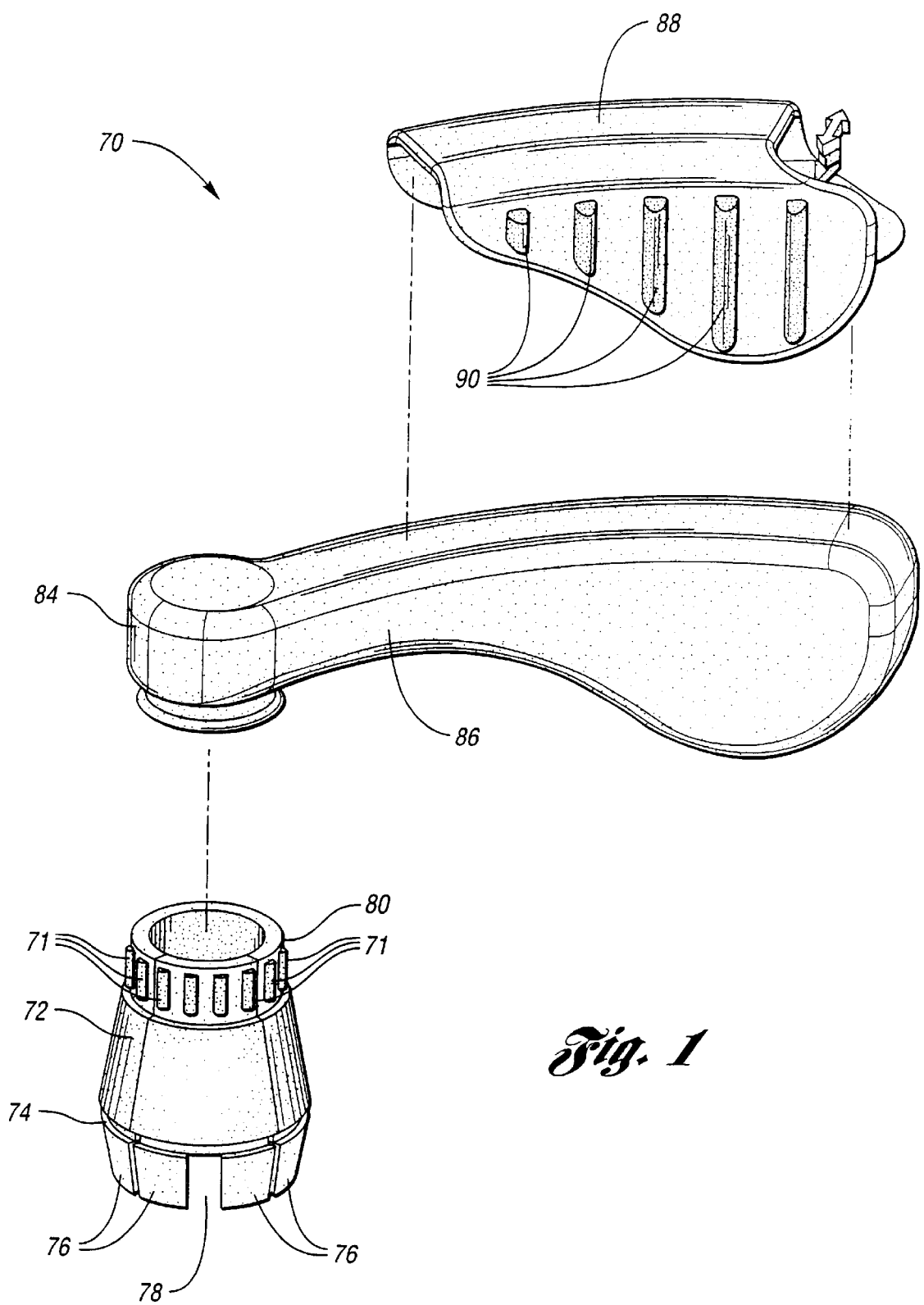
FIG. 1 shows an exploded perspective view of a cup holder arm assembly in accordance with the invention.
Figure 2:
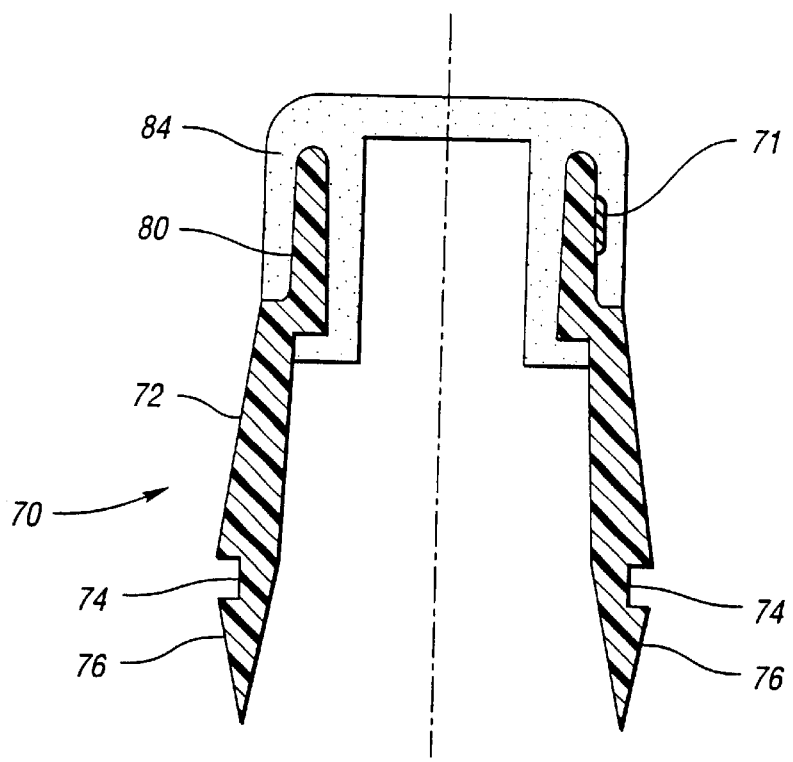
FIG. 2 shows a vertical cross-sectional view of the base and arm cup of FIG. 1.
Figure 3:
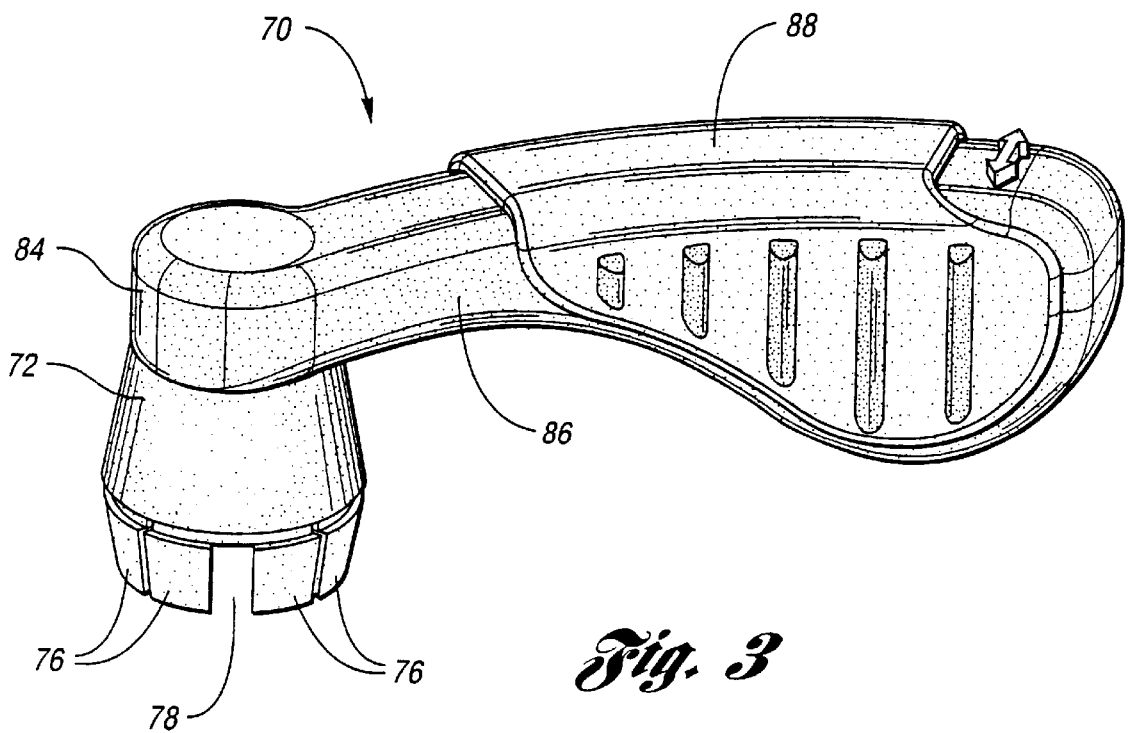
FIG. 3 shows a perspective assembled view of the cup holder arm assembly of FIG. 1.
Figure 8:
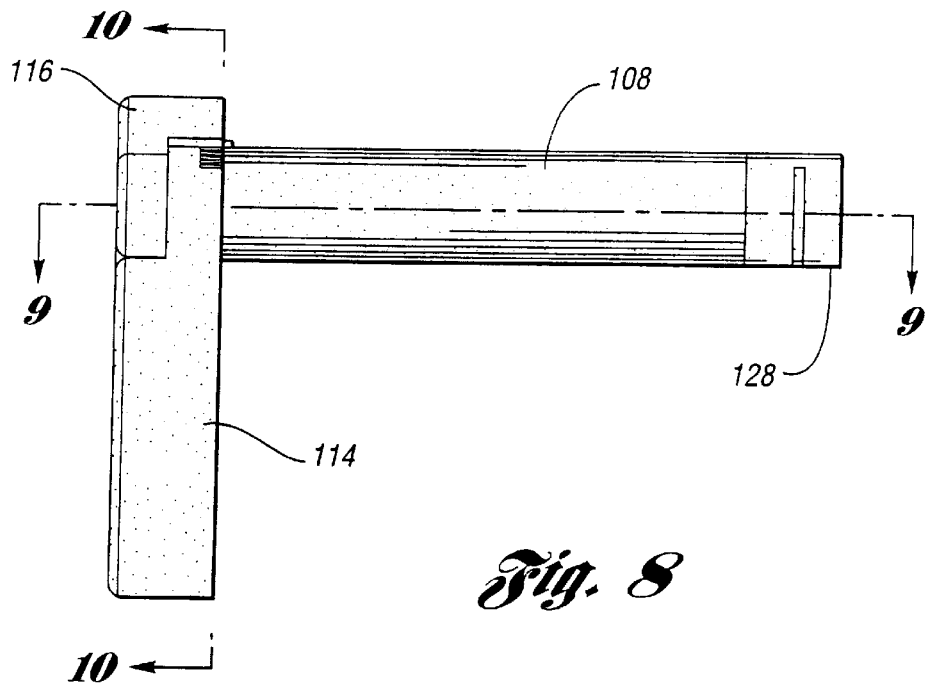
FIG. 8 shows a side view of the cup holder arm assembly of FIG. 7.
Figure 9:
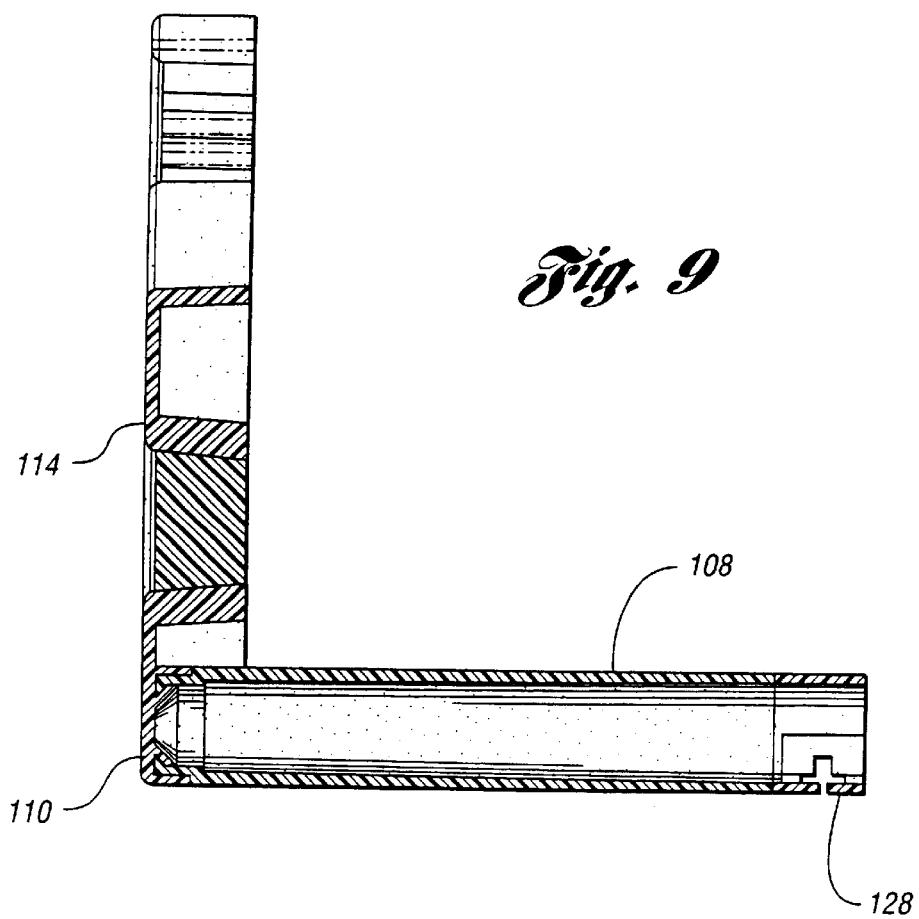
FIG. 9 shows a cross-sectional view taken at line 9—9 of FIG. 8.
Figure 10:
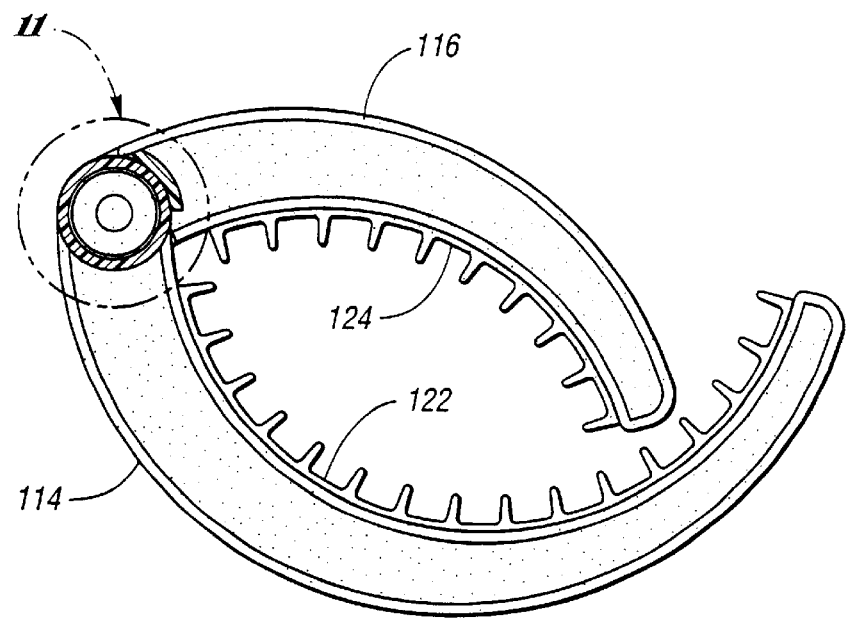
FIG. 10 shows a sectional view taken at line 10—10 of FIG. 8.

Referring to FIGS. 1–3, a cup holder arm assembly 70 is shown in accordance with a first embodiment of the invention. The cup holder 70 is manufactured by a three-shot molding process. The first step of the process is to injection mold the base 72 of a polypropylene material. The base 72 includes a circumferential groove 74 and a plurality of snap tabs 76 adapted for a snap-fit engagement within an aperture formed in a vehicle console adjacent a cup holder opening, such as that described later with respect to FIGS. 4 and 5. A recess 78 is formed between the snap tabs 76 for locking engagement with a corresponding tooth in the console aperture. In this manner, the base 72 is rigidly attached to a vehicle console adjacent a cup holder opening.

Prior to beginning the second shot of injection molding, a hot runner in the injection molding tool is used to carry soft molded rubber to the peripheral edge 80 of the base 72 to form rubber serrations 71 around the peripheral edge 80, as shown in FIGS. 1 and 2. These rubber serrations may be vertical or horizontal, and the thickness and frequency may vary depending upon the application. This soft rubber material is the same as that used in the third injection molding shot, to be described below.

After the serrations 71 have been molded onto the peripheral edge 80, while the base 72 is positioned within a mold, the arm cup 84 is overmolded onto the base 72 in the second shot of the three-shot molding process. The arm cup 84 is preferably an ABS material, or other material which will not chemically bond to the base 72. In this manner, the arm cup 84 may be overmolded around the peripheral edge 80 so that, in the final molded product, the arm cup 84 is rotatable with respect to the base 72 to allow infinite pivotal adjustment of the arm cup 84 with respect to the base 72, with the rubber serrations 71 on the peripheral edge 80 providing sufficient frictional engagement with the arm cup 84 to hold the arm 86 in a selected position when desired.

Finally, a third shot of material is overmolded onto the arm 86 to form the soft rubber grip 88 for engaging a cup. The grip 88 includes ribs 90 on the surface thereof for engaging the cup. The third shot is preferably a soft rubber material, such as neoprene.

The three-shot molding process may be accomplished by rotating in separate mold halves to form the second and third shots 84,88, such as in a rotational molding process. Alternatively, three molds could be used sequentially to form the different components, wherein the base would be molded in a first mold, and moved to a second mold where the arm cup and arm are added, and the rubber grip is molded onto the arm in a third mold.

This cup holder assembly is advantageous over prior art designs because the three-shot overmolding process eliminates manual assembly, which improves quality, and it eliminates the multiple components of a typical cup holder arm assembly which may include springs, cams, dampers, etc. The swing arm efforts can be tuned to any customer requirement, and the assembly could be styled to meet the needs of any interior.

Turning to FIGS. 4–13, a second embodiment of the invention is shown. As shown in FIGS. 4 and 5, a vehicle cup holder assembly 100 includes a vehicle component, such as a console 102 including a cup holder opening 104 therein and an aperture 106 formed adjacent the cup holder opening 104.

A base 108 is injection molded from a first material and includes an attachment feature which extends into the aperture 106. In this instance, the attachment feature is the configuration of the base 108 which slidably fits within the aperture 106 for attachment to the console 102. The base 108 is selectively movable between an extended position shown in FIG. 4 and a collapsed position shown in FIG. 5.

As shown more clearly in the following figures, an arm cup 110 is injection molded from a second material, such as polypropylene, around the top portion 112 of the base 108. The second material is not chemically bonded to the first material, which is preferably nylon, so that the arm cup 110 and arm 114 are rotatable with respect to the base 108 for adjustably securing a cup in the cup holder opening 104.

Figure 13:
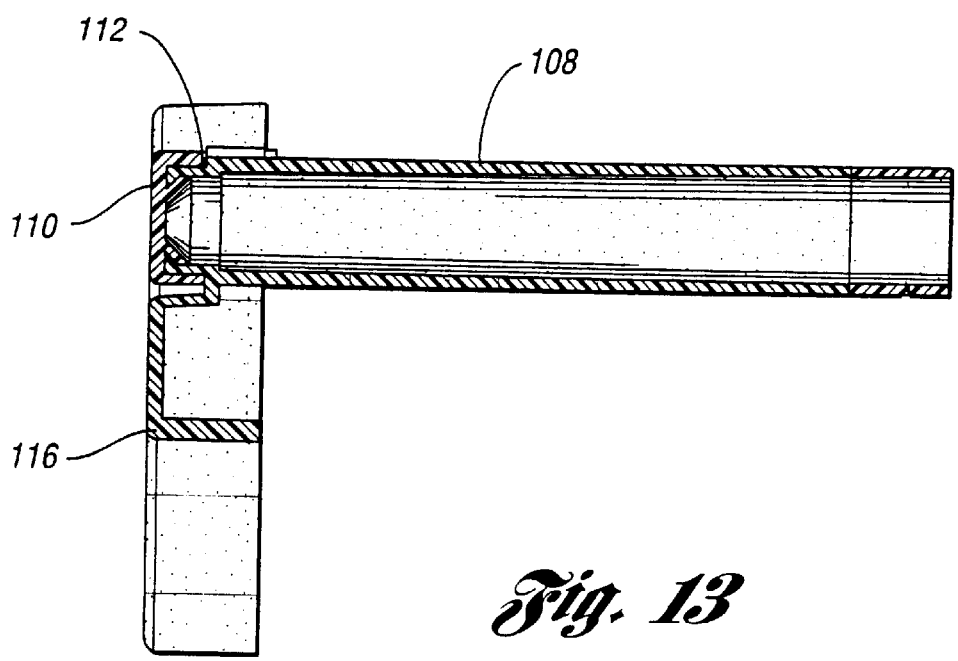
FIG. 13 shows a sectional view taken at line 13—13 of FIG. 12.

As shown in FIG. 13, a second, stationary arm 116 is integrally molded with the base 108 so that the movable arm 114 may press a cup against the stationary arm 116 for holding the cup in position.

Figure 11:
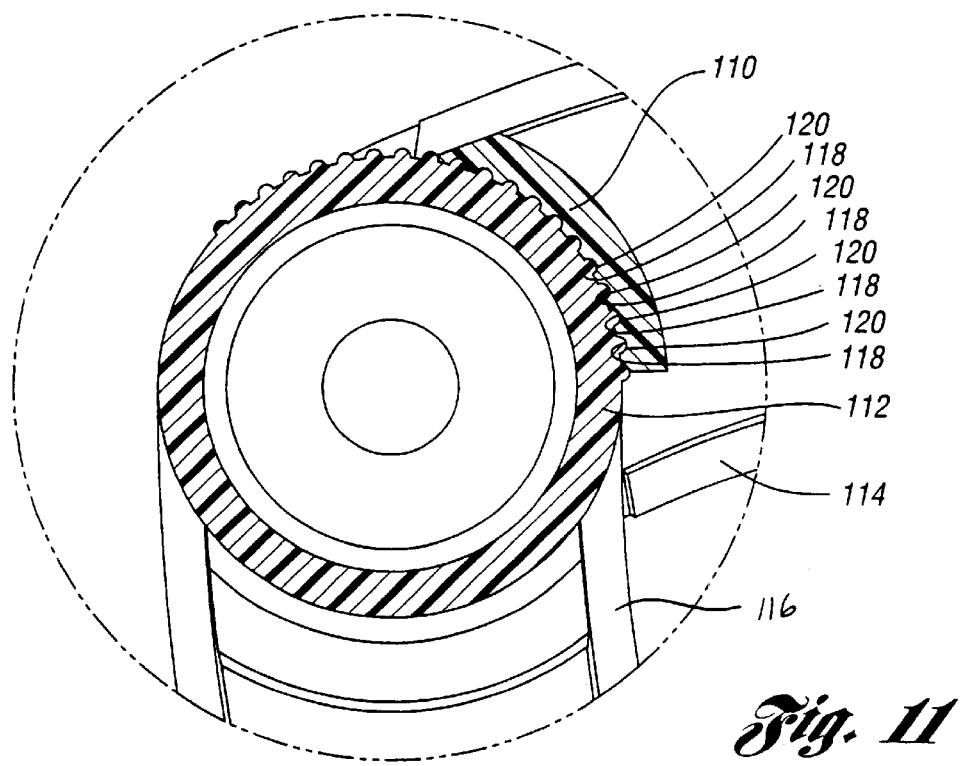
FIG. 11 shows an enlarged partial sectional view taken at detail 11—11 of FIG. 10.
Figure 12:
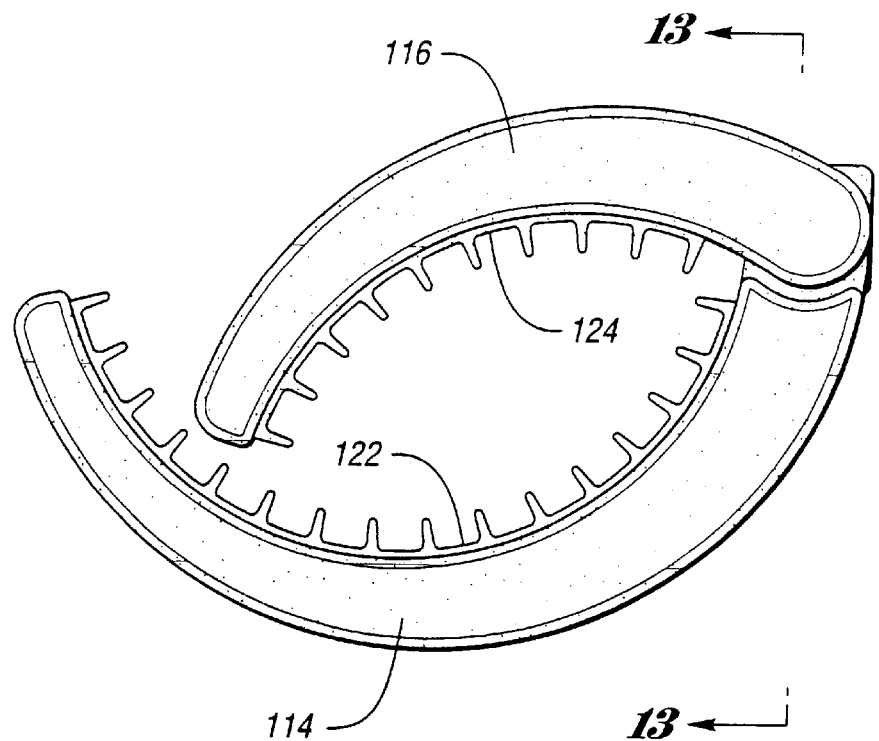
FIG. 12 shows a top plan view of the cup holder arm assembly of FIG. 7.

As mentioned above, the first and second materials of the base 108 and arm cup 110, respectively, do not chemically bond with each other to allow respective pivotal movement. However, a friction fit or interference fit is provided between the arm cup 110 and the top portion 112 of the base 108. As shown in FIG. 11, which is a detailed view taken from detail 11—11 of FIG. 10, the base top portion 112 is provided with a plurality of integral teeth 118 extending therefrom which are engageable, respectively, with the slots 120 formed in the arm cup 110. The arm 114 provides a sufficiently long moment arm to enable respective pivotal adjustment by sliding the teeth 118 across the slots 120 with minimal effort. The engagement of the teeth 118 in the slots 120 provides sufficient frictional or locking engagement to secure a cup in position when the arm 114 is adjusted with respect to the second arm 116.

A third, rubber material is injection molded onto the arms 114,116 to form rubber grips 122,124 thereon, respectively. The third material is preferably a soft rubber, such as neoprene or sanoprene.

In order to provide the pop-up feature in the cup holder assembly 100 for movement between the positions shown in FIGS. 4 and 5, the bottom portion 128 of the base 108 may be engaged with a spring damper for selective deployment between the collapsed and extended positions. The device may also be of the "push—push" type so that the user may simply press the base 108 downward to cause disengagement and movement to the deployed position from the collapsed position (i.e., pop-up movement), and may again press the base 108 downward for movement from the extended position to the collapsed position.

The movable cup holder arm 114 is pivotally movable whether the base 108 is in the collapsed or extended position so that the cup holder assembly 100 may support differently-sized cups in the different positions.

While the best modes for carrying out the invention have been described in detail, those familiar with the art to which this invention relates will recognize various alternative designs and embodiments for practicing the invention without departing from the spirit and scope of the invention, as defined in the appended claims.

What is claimed is:

1. A method of manufacturing a vehicle cup holder arm assembly comprising:

injection molding a first material to form a base including an attachment feature adapted for engagement within an aperture adjacent a cup holder opening in a vehicle;

injection molding a second material to form an arm with an arm cup around the base, wherein the second material does not chemically bond to the first material so that the arm cup and arm are rotatable with respect to the base for adjustably securing a cup in the cup holder opening; and injection molding a third material onto the arm to form a soft rubber grip for engaging a cup.

2. The method of claim 1, further comprising forming a plurality of rubber bumps on the base prior to molding said second material, said rubber bumps being operative to provide sufficient frictional engagement with the arm cup to hold the arm in a selected position after the arm is adjusted.

3. The method of claim 1, wherein said step of forming an attachment feature comprises forming a plurality of snap tabs.

4. The method of claim 3, wherein said step of forming an attachment feature further comprises forming a circumferential attachment groove.

5. The method of claim 2, wherein said rubber bumps comprise the same material as said third material.

6. The method of claim 1, wherein the first material comprises polypropylene and the second material comprises ABS.

7. A method of manufacturing a vehicle cup holder arm assembly, the method comprising:

injection molding a base having a circumferential groove and a plurality of snap tabs adapted for a snap-fit engagement with an aperture adjacent a cup holder opening in a vehicle;

over molding an arm with an arm cup around the base, wherein the arm and arm cup are made out of a material so that the arm cup and arm are rotatable with respect to the base for adjustably securing a cup in the cup holder opening; and over molding a soft rubber grip on the arm for engaging the cup.

* * * * *